(12) United States Patent
Koehler et al.

(10) Patent No.: US 12,137,686 B1
(45) Date of Patent: Nov. 12, 2024

(54) TERMITE TRAILING AND RECRUITMENT PRODUCT AND PROCESS

(71) Applicant: Florida Insect Control Group LLC, Gainesville, FL (US)

(72) Inventors: Philip G Koehler, Gainesville, FL (US); Enrico Paolo Levi, Modena (IT); Allen Morris Fugler, Jr., Santa Fe, NM (US); Dawid Liszka, Jaworzno (PL)

(73) Assignee: Florida Insect Control Group LLC, Gainesville, FL (US)

( * ) Notice: Subject to any disclaimer, the term of this patent is extended or adjusted under 35 U.S.C. 154(b) by 0 days.

(21) Appl. No.: 18/419,071

(22) Filed: Jan. 22, 2024

Related U.S. Application Data

(63) Continuation-in-part of application No. 18/367,829, filed on Sep. 13, 2023, now abandoned.

(60) Provisional application No. 63/442,639, filed on Feb. 1, 2023.

(51) Int. Cl.
  *A01N 31/14* (2006.01)
  *A01P 19/00* (2006.01)

(52) U.S. Cl.
  CPC .............. *A01N 31/14* (2013.01); *A01P 19/00* (2021.08)

(58) Field of Classification Search
  CPC ................................ A01N 31/14; A01P 19/00
  See application file for complete search history.

(56) References Cited

U.S. PATENT DOCUMENTS

| | | | |
|---|---|---|---|
| 5,024,832 A | 6/1991 | Omata | |
| 6,266,918 B1 | 7/2001 | Henderson | |
| 6,352,703 B1 | 3/2002 | Henderson | |
| 6,370,812 B1 | 4/2002 | Burns | |
| 6,585,991 B1 | 7/2003 | Rojas | |
| RE40,884 E | 9/2009 | Masterson | |
| 8,111,155 B2 | 2/2012 | Barber | |
| 2006/0207164 A1 | 9/2006 | Pearson | |

FOREIGN PATENT DOCUMENTS

| | | | | |
|---|---|---|---|---|
| CN | 104973983 A | 10/2015 | | |
| WO | WO-2010127019 A1 | * | 11/2010 | ........... A01N 25/006 |

OTHER PUBLICATIONS

TermiteDIY. Obtained from Wayback machine on Oct. 2020, <https://web.archive.org/web/20201020203756/ https://termitediypestcontrol.com/products/advance-termite-bait-station>. (Year: 2020).*
Pest Control Technology. Obtained from <https://www.pctonline.com/article/pct1002_adapting/>, 2010. (Year: 2010).*
Fei, Huixin, et al. "Increased search tunnel formation by Coptotermes formosanus Shiraki (Isoptera: Rhinotermitidae) in 2-phenoxyethanol treated sand." Journal of entomological science 40.3 (2005): 327-336. (Year: 2005).*
Pest Solution 365. Obtained from Wayback machine from https://web.archive.org/web/20190523071637/https://pestsolutions365.com/termites-101/full-perimeter-treatment/. 2019. (Year: 2019).*
Cornelius, Mary L. et al., Efficacy of Bait Supplements for Improving the Rate of Discovery of Bait Stations in the Field by Formosan Subterranean Termites (Isoptera: Rhinotermitidae), Household and Structural Insects, Journal of Economic Entomology, 7 pages, Jan. 2009, vol. 102, No. 3., New Orleans, LA, USA.
Botch, Paul S. et al., Effects of Soil Cations on the Foraging Behavior of Reticulitermes flavipes (Isoptera: Rhinotermitidae), Ecology and Behavior, Journal of Economic Entomology, 11 pages, Dec. 10, 2010, vol. 4, No. 2.
Prescott, Luke, Master's Thesis Draft: Soil Tunneling/Tubing by Subterranean Termites in Response to 2-Phenoxyethanol, Department of Entomology and Nematology University of Florida, 25 pages, May 2021.
Soil Infiltration, Soil Health—Guides for Educators, retrieved on Jan. 19, 2024, https://cropwatch.unl.edu/documents/USDA_NRCS_infiltration_guide6-4-14.pdf, 7 pages.
Florida Insect Control Group LLC, PCT Patent Application No. PCT/US24/19121, filed on Mar. 8, 2024, Notification of the Transmittal of the International Search Report and the Written Opinion of the International Searching Authority, or the Declaration, mailed Apr. 16, 2024, 9 pages.
DIY Pest Control, Advanced Termite Bait Station—Outdoor, retrived from https://termitediypestcontrol.com/collections/termites-control/products/advance-termite-bait-station on Aug. 6, 2024, 7 pages.

* cited by examiner

*Primary Examiner* — Mina Haghighatian
*Assistant Examiner* — Janice Y Silverman
(74) *Attorney, Agent, or Firm* — Brian S. Steinberger; Hilary F. Steinberger; Steinberger IP Law

(57) ABSTRACT

Termite trailing and recruitment compositions, systems, devices, and methods for using a trail of a percentage 2 phenoxyethanol (2-PE) dissolved in water to form a trail to lead the subterranean termites to termite bait or monitoring stations located about a perimeter of a wood containing structure. The termite bait or monitoring stations can be located up to approximately 20 feet apart from one another, and the trail of a percentage 2 phenoxyethanol (2-PE) dissolved in water. The percentage 2 phenoxyethanol (2-PE) dissolved in water range from approximately 0.1% to approximately 2% depending on the different soil types and localized conditions. The types of soil can commonly include sand, sandy & silty soil, loam and clay soil.

25 Claims, 4 Drawing Sheets

A1 House or structure

B1 Termite bait stations / termite detection stations

C1 Termite bait matrix or detection device

D1 Termite trailing product applied to soil surface that connects stations

A2 Termite infested wood

B2 Termite tunnel in wood

C2 2-PE + KCl injected into tunnel and absorbed into wood

D2 Termite bait station attached to wood surface

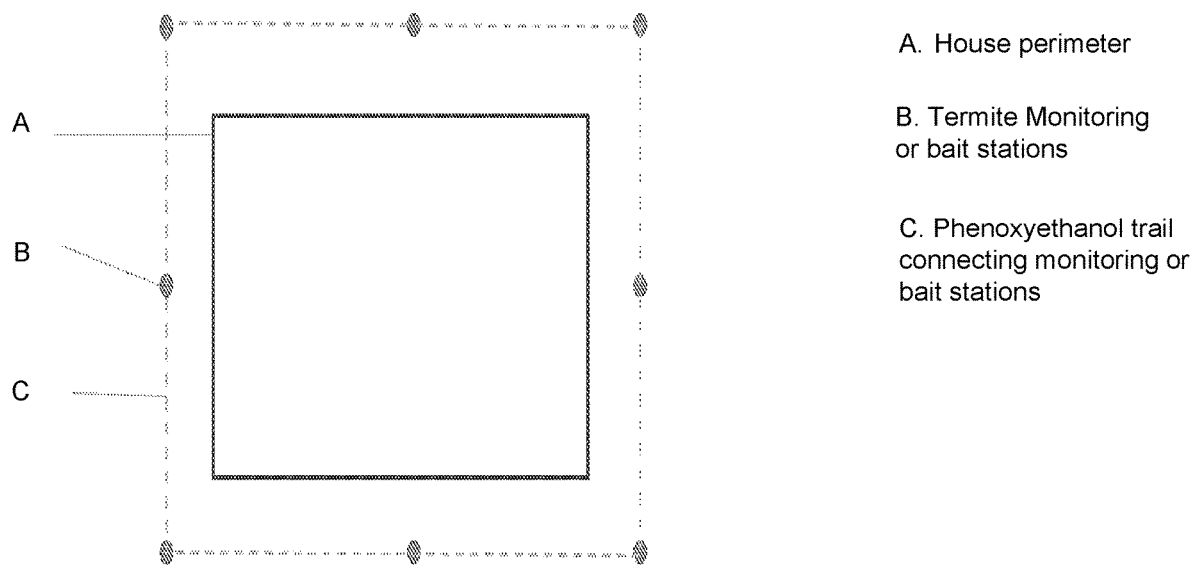
FIG. 5 Diagram of connecting monitoring or bait stations around a house to prevent termites from tunneling between stations.
A. House perimeter
B. Termite Monitoring or bait stations
C. Phenoxyethanol trail connecting monitoring or bait stations

TERMITE TRAILING AND RECRUITMENT PRODUCT AND PROCESS

CROSS REFERENCE TO RELATED APPLICATIONS

This application is a Continuation In Part of U.S. patent application Ser. No. 18/367,829 filed Sep. 13, 2023, which claims the benefit of priority to U.S. Provisional Application Ser. No. 63/442,639 filed Feb. 1, 2023. The entire disclosure of each of the applications listed in this paragraph are incorporated herein by specific reference thereto.

FIELD OF INVENTION

This invention relates to increasing soil or wood moisture to encourage termites to tunnel and/or trail to termite detectors or a toxicant. Using recruitment compositions, soil or wood treatment compositions, systems, devices, and methods for using 2-phenoxyethanol or 2-phenoxyethanol+potassium salt, dissolved in water. The application of correct concentrations of solutions, dependent on soil types, forms a hygroscopic termite barrier around a wood containing structure and between termite bait and monitoring stations. in order to lead termites to termite toxicants, bait stations and/or monitoring stations.

BACKGROUND AND PRIOR ART 2-phenoxyethanol is a solvent that mimics the trail pheromone of termites. It is found as a solvent in ballpoint pens, and also is used in food and cosmetics. Termites have been known to follow the ink trail for at least 50 years.

Greg Henderson and his colleagues (Jian Chen and Roger Laine identified the trail pheromone mimic in pen ink as 2-phenoxyethanol. (Chen, J, G. Henderson, and R. Laine, 1998. Isolation and Identification of 2-phenoxyethanol from ballpoint pen ink as a trail-following substance of *Coptotermes formosanus* and *Reticulitermes*. J. Entomological Science 33:97-105

Greg Henderson et al. at LSU patented 2-phenoxyethanol applications to baits to specifically kill termites (patent is attached), but not soil treatments of the trail pheromone mimic to allow discovery and mortality of termites as part of a total program. See U.S. Pat. No. 6,352,703 to Henderson et al. issued Mar. 5, 2002, which is incorporated by reference.

There is a patent on the use of the natural trail pheromone (dodecatrianol) for termite detection and control (see U.S. Pat. No. 5,024,832), but not for using 2-phenoxyethanol.

A May 2022 Thesis by L. Prescott, discussed, the use of 2-phenoxyethanol as a trail pheromone soil treatment to lead termites to pop-up termite detection stations. The project showed that termites will feed more on cellulose material surrounded by the treatment and in the field the treatment will lead them to detection stations (5 of 20 2-phenoxyethanol soil-treated stations hit, compared to 0 of 20 that were not treated. See Prescott, Luke, Master's Thesis for Soil Tunneling/Tubing by Subterranean Termites in Response to 2-phenoxyethanol, Department of Entomology and Nematology, University of Florida, May 2022.

Other scientists have discovered that termites detect and follow salts in soils that leach from logs as they decay. See Botch and Judd., Effects of Soil Cations on the Foraging Behavior of *Reticulitermes flavipes* (Isoptera: Rhinotermitidae). Ecology and Behavior, Journal of Economic Entomology, Vol. 104, No. 2, pages 425-435, April 2011. Potassium cations were the only ones to attract termites.

Scientists have also found that salts in sports drinks are followed by termites. These salts can include potassium salts that mimic the salts that leach from logs. We have hypothesized that by combining 2-phenoxyethanol and potassium salt, termites will reliably follow the trail to detection traps or termite treatments. See Cornelius et al., Efficacy of Bait Supplements for Improving the Rate of Discovery of Bait Stations in the Field by Formosan Subterranean Termites (Isoptera: Rhinotermitidae), Journal of Economic Entomology, Vol, 102, no. 3, pages 1175-1181, 2009.

The prior art ignores the fact that 2-phenoxyethanol is not closely related to the natural trail pheromone of termites, dodecatrianol. Glycols like 2-phenoxyethanol and potassium chloride or carbonate absorb moisture from the air or surrounding soil. Termites are, therefore, following an elevated water holding trail of high soil/wood moisture rather than a pheromone trail. Termites orient to high moisture and will follow soil/wood of elevated water content.

The prior art also applied a single concentration of 2-phenoxyethanol to the soil, ignoring the fact that some soils/wood (e.g., sand or pine) is more porous than other soils (e.g., clay or oak). Porosity of wood/soil is important because no single concentration of an applied product can provide the necessary high water content needed to affect termite behavior. Termites prefer to be in moist rather than dry soils, so they will follow a trail of high water content soil for detection or control. Therefore, the application of a single concentration of 2-phenoxyethanol and/or potassium salt to different soil types cannot deliver the correct amount of 2-phenonxyethanol and/or potassium salt to a volume of treated soil.

Also, there was no previous study that included 2 hygroscopic products, like 2-phenoxyethanol and potassium salts, to change the physical nature of soil/wood so water in the treated area has a higher water content than the surrounding soil/wood. No previous study has documented that the physical water holding nature of soil can be used to affect termite behavior.

No previous patent has demonstrated that surrounding a structure containing wood with a hygroscopic soil/wood treatment will lead termites to bait or toxicants and protect the structure from termite attack.

Thus, the need exists for solutions to the above problems with the prior art.

SUMMARY OF THE INVENTION

A primary objective of the present invention is to increase the physical water holding capacity of soil to direct termites to toxicants and/or detection devices using recruitment compositions, systems, devices, and methods that include between approximately 0.1% to approximately 2.0% of 2-phenoxyethanol dissolved in water, so the termites will reliably follow a higher soil water trail to termite toxicants, monitoring stations, and/or bait stations.

A secondary objective of the present invention is to provide variable application percentages and rates of stations. 2-phenoxyethanol and/or potassium salts dissolved in water, to form an elevated water holding trail for different soil types (sand, sandy & silty soil, Loam and clay soil) leading to termite toxicants, termite bait stations, and/or termite monitoring stations.

A third objective of the present invention is to provide a complete barrier around a structure so termites will be redirected due to elevated soil water concentrations that connect termite toxicants, monitoring stations and/or bait stations arranged about a perimeter of a wood containing structure.

A preferred embodiment of the termite trailing and recruitment system, comprises:

a plurality of termite bait and monitoring stations positioned about a wood-containing structure; and a trail of 2 phenoxyethanol (2-PE) applied to soil between each of the termite bait and/or monitoring stations, wherein each trail directs termites away from the wood-containing structure to an individual termite bait and/or monitoring station.

The 2 phenoxyethanol (2-PE) ranges from approximately 0.1% to approximately 2% depending on the soil type and localized conditions.

The 2 phenoxyethanol (2-PE) is approximately 0.1% dissolved/suspended in water as the trail for sand soil.

The 2 phenoxyethanol (2-PE) is approximately 0.2% dissolved/suspended in water as the trail for sandy and silty soil.

The 2 phenoxyethanol (2-PE) is approximately 0.4% dissolved/suspended in water as the trail for loam soil.

The 2 phenoxyethanol (2-PE) is approximately 2% dissolved/suspended in water as the trail for clay soil.

The trail is approximately 10 to approximately 20 feet between each of the termite bait and/or monitoring stations.

The termite bait and monitoring stations are located up to approximately 10 to approximately 20 feet apart from one another in a perimeter about the wood-containing structure.

The 2 phenoxyethanol (2-PE) ranges from approximately 0.1% to approximately 2% depending on the soil type and localized conditions, and the trail is approximately 10 to approximately 20 feet between each of the termite bait and/or monitoring stations.

The 2 phenoxyethanol (2-PE) ranges from approximately 0.1% to approximately 2% depending on the soil type and localized conditions, and the termite bait and monitoring stations are located approximately 10 to approximately 20 feet apart from one another in a perimeter about the wood-containing structure.

A method for trailing and recruiting termites to termite bait and monitoring stations, comprises the steps of:

providing a plurality of termite bait and monitoring stations positioned about a wood-containing structure; and applying a trail of a percentage 2 phenoxyethanol (2-PE) dissolved/suspended in water to soil located between each of the termite bait and monitoring stations, wherein each trail leads termites away from the wood-containing structure to an individual termite bait and/or monitoring station.

The percentage 2 phenoxyethanol (2-PE) dissolved in water ranges from approximately 0.1% to approximately 2% depending on the soil type and localized conditions.

The 2 phenoxyethanol (2-PE) is approximately 0.1% dissolved/suspended in water as the trail for sand soil.

The 2 phenoxyethanol (2-PE) is approximately 0.2% dissolved/suspended in water as the trail for sandy and silty soil.

The 2 phenoxyethanol (2-PE) is approximately 0.4% dissolved/suspended in water as the trail for loam soil.

The 2 phenoxyethanol (2-PE) is approximately 2% dissolved/suspended in water as the trail for clay soil.

The trail is approximately 10 to approximately 20 feet between each of the termite bait and/or monitoring stations.

The termite bait and monitoring stations are located up to approximately 10 to approximately 20 feet apart from one another in a perimeter about the wood-containing structure.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 5 is a diagram layout view of a house structure with termite monitoring or bait stations arranged about the perimeter, along with a 2-phenoxyethanol and/or potassium chloride elevated soil water trail connecting between each of the termite monitoring or bait stations.

DESCRIPTION OF THE PREFERRED EMBODIMENTS

Figure 1:
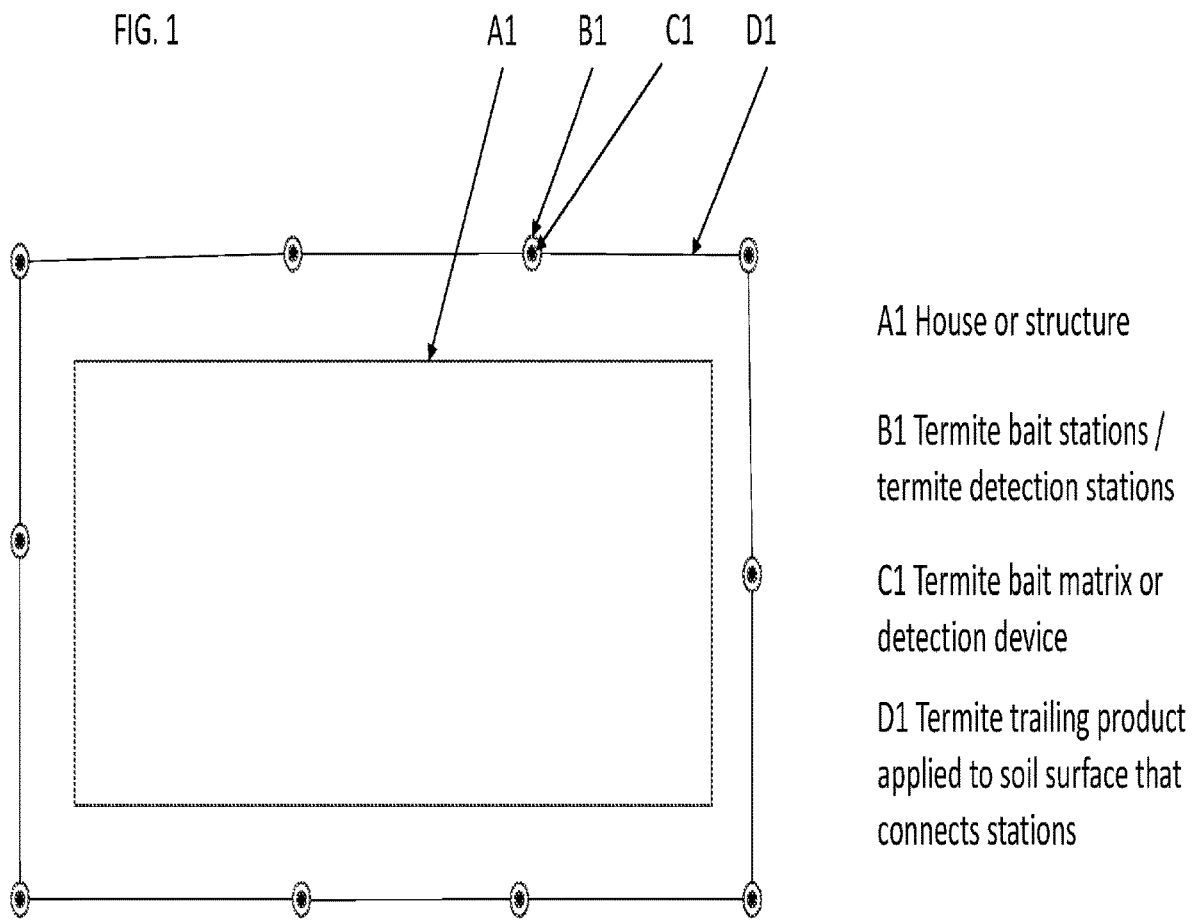
FIG. 1 shows a diagrammatic layout view of the novel termite treatment composition applied to soil between termite treatment devices spaced about an exterior of a rectangular structure to be protected.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale. For ease of notation, 2-phenoxyethanol is referred to as 2PE, potassium chloride is referred to as KCl, and potassium carbonate is referred to K2CO3. A list of the components in the figures will now be described.

A1 Rectangular house or structure
B1 Termite bait stations/termite detection stations
C1 Termite bait matrix or termite detection device
D1 Termite hydroscopic soil treatment product applied to soil that connects stations
A2 Termite infested wood
B2 Termite tunnel in wood
C2 Termite treatment product injected into tunnel and absorbed in wood
D2 Termite bait station attached to wood surface.

A first embodiment of the termite trail pheromone mimic would be diluted in water using-phenoxyethanol between approximately 280 ppm to approximately 2000 ppm and is dissolved in water and applied to soil surrounding a location for detecting termites or killing termites.

A preferred amount of the 2-phenoxyethanol would be dependent on soil type. For instance, it would include approximately 0.1% or 1,000 ppm, and is dissolved in water and applied to sandy soil surrounding a location for leading the termites to a termite toxicant, bait station or detection station. For clay soil, approximately 2% or 20,000 ppm of 2-phenoxyethanol dissolved in water would be applied to soil surrounding a location for leading termites to a toxicant, bait station, and/or detection station.

A second embodiment of the novel termite trail pheromone mimic would be diluted in water using 2-phenoxyethanol dissolved in water at approximately 1000 ppm in combination with potassium carbonate or potassium chloride (KCl or K2CO3) at (between approximately 0.129% or 129 ppm) and applied to sandy soil surrounding a location for detecting termites or killing termites. For clay soil, approximately 2.58% or 25,800 ppm of KCL or K2CO3 dissolved in water would be applied to soil surrounding a location for leading termites to a toxicant, bait station, and/or detection station.

The combination of 2-phenoxyethanol dissolved in water, with potassium carbonate or potassium chloride (KCl or K2CO3), can be injected into wood for wood treatment in order for drywood termites to follow a water gradient to a toxicant or bait station.

FIG. 1 shows a diagrammatic layout view of the novel termite treatment composition applied to soil between termite treatment devices B1/C1 spaced about an exterior structure A1 to be protected.

The termite treatment devices B1/C1 can include but not be limited to B1 termite bait stations and/or termite detection stations, and C1 termite bait matrix and/or detection devices.

U.S. Pat. No. 6,266,918 to Henderson, which is incorporated by reference, teaches about how 2-PE can be applied directly to termite baits improve foraging activity. The Henderson "918 patent did not address the application of 2-PE to soil, only to termite baits directly. U.S. Pat. No. 8,111,155 to Barber, which is incorporated by reference describes a design of a station to contain termite bait.

A termite bait station referenced in FIG. 1 can include but is not limited to U.S. Pat. RE40,884 to Masterson, which is incorporated by reference.

A termite detection station, referenced in FIG. 1 can include but is not limited to U.S. Published Patent Application 2006/0207164A1, which is incorporated by reference.

A termite bait matrix referenced in FIG. 1, can include, but is not limited to, U.S. Pat. No. 6,585,991 B1 to Rojas et al., which is incorporated by reference.

A detection device referenced in FIG. 1, can include, but is not limited to U.S. Pat. No. 6,266,918 to Henderson, which is incorporated by reference.

The structure A1 to be protected can include a house or other wood framed structure.

The termite treatment devices B1/C1 are generally spaced apart from one another exterior to the outside perimeter of the structure A1.

Figure 2:
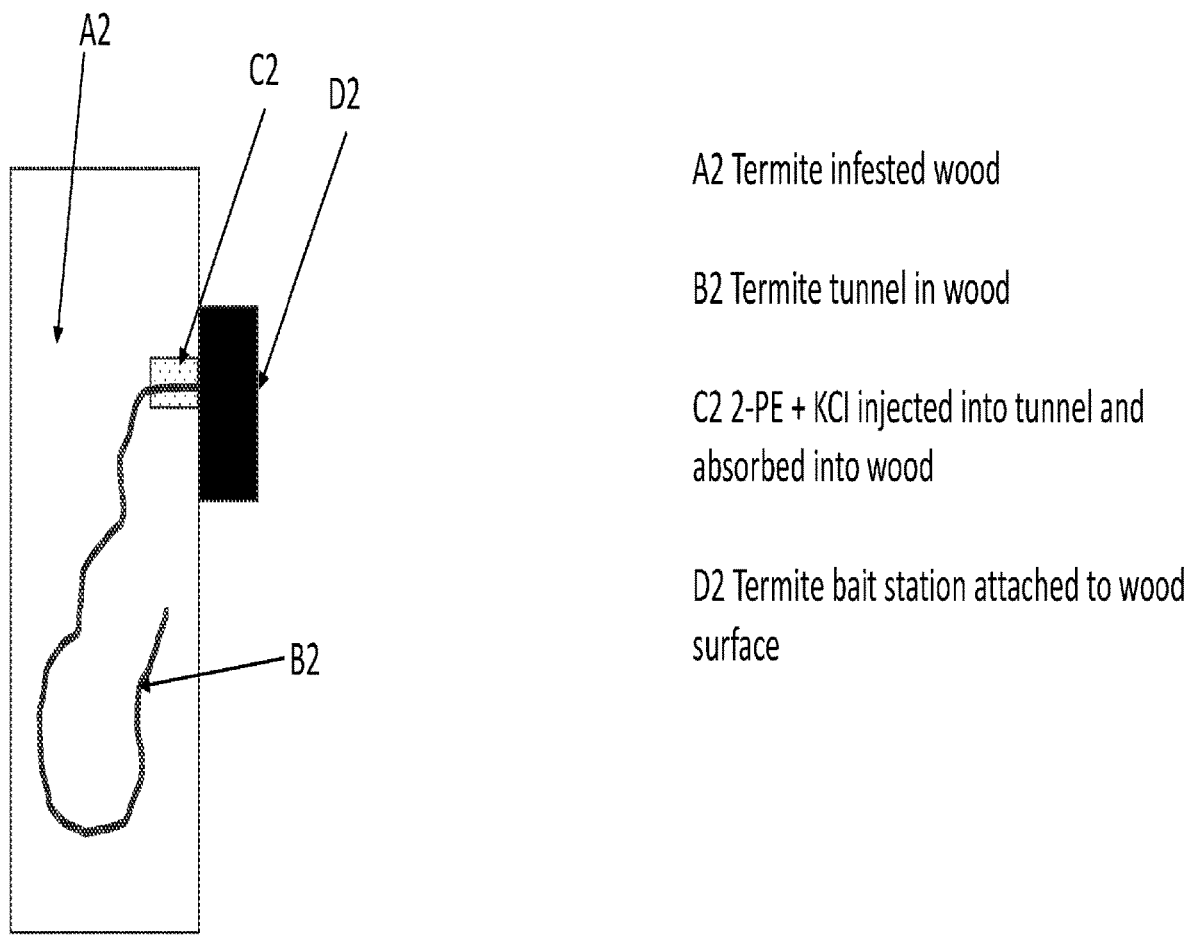
FIG. 2 shows a diagrammatic layout view of the novel termite treatment composition injected into a termite tunnel within termite infested wood adjacent to a termite bait station attached to the wood surface.

The composition (2-phenoxyethanol would include approximately 1,000 ppm, and is dissolved in water) can be used in both applications to sandy soil shown in FIG. 1 and FIG. 2.

The user can apply the novel treatment composition of the first embodiment referenced above to the surface of the soil between the treatment devices B1/C1.

The above composition can apply under pressure to the soil surface using a tank, pump and hose assembly, or simply poured onto the soil. Alternately, in can be applied in a trench dug in the soil using a spray assembly or pouring from a reservoir of the composition.

The above composition can also be injected under the ground for the FIG. 2 application. The composition can be Injected into wood as per FIG. 2 with traditional pest control equipment that applies product under pressure, and it can be injected into the soils as previously described.

Referring to FIGS. 1 and 2, either of the referenced compositions can be applied between bait or monitoring stations to completely surround a structure or area of termite concern, in order lead termites into stations.

FIG. 2 shows a diagrammatic layout view of the novel termite treatment composition C2 injected into a termite tunnel within termite infested wood A2 adjacent to a termite bait station D2 attached to the wood surface.

A bait station D2 referenced in FIG. 2 can include, but is not limited to U.S. Pat. No. 6,370,812B1 to Burns et al., which is incorporated by reference.

The second embodiment of the novel termite trail pheromone mimic would be diluted in water using 2-phenoxyethanol dissolved in water at approximately 1000 ppm in combination with potassium carbonate or potassium chloride (KCl or K2CO3) at (between approximately 129 to approximately 500 ppm) and injected into termite infested wood adjacent to a termite bait station.

A preferred amount of the potassium carbonate or potassium chloride (KCl or K2CO3) would be approximately 500 ppm.

The combination of 2-phenoxyethanol dissolved in water, with potassium carbonate or potassium chloride (KCl or K2CO3), can be injected into wood to form an elevated wood water concentration in order to lead drywood termites to a bait station or for wood treatment.

The second composition 2-phenoxyethanol dissolved in water with potassium carbonate or potassium chloride) can be used in both FIG. 1 and FIG. 2 applications. For the FIG. 1 application, the second composition can be applied to the soil as previously described.

The second composition 2-phenoxyethanol dissolved in water with potassium carbonate or potassium chloride) can be injected into termite galleries using a syringe or spray assembly. The termite galleries would be adjacent to the termite bait station and attached to the damaged wood.

Testing of the novel termite trailing and recruitment compositions took place at the New Orleans Mosquito, Termite and Control District in New Orleans, Louisiana from Jun. 16 to Jun. 20, 2023.

The objective of the tests was to determine which prepared formulation of composition product most attracts and induces feeding behavior in Formosan subterranean termites.

Species:

For this protocol, individuals from a single colony of Formosan subterranean termites, *Coptotermes formosanus*, were used. Termites were collected from previously established field collection crates in New Orleans. This study was initiated within 3 days of termite collection.

Treatments:

The following ready-to-use solutions were tested for this study:
1. Composition according to the invention. Composition according to the invention 2Pe 0.1%
2. Composition according to the invention. Composition according to the invention 2PE+$K_2CO_3$ 0.05%
3. 2PE+KCl 0.05%
4. Water (untreated control)

Replicates:

There were 10 replicates for each choice test. Each choice test involved a combination of two of the treatments to be tested, listed in the previous section. The following is a summary Table A of each replicate for this study.

TABLE A

| Treatment A | Treatment B | No. replicates |
| --- | --- | --- |
| Composition according to the invention | Composition according to the invention | 10 |
| Composition according to the invention 2PE 0.1% | Composition according to the invention + $K_2CO_3$ 0.05% | |
| Composition according to the invention: 2PE + $K_2CO_3$ 0.05% | Composition according to the invention | 10 |
| | Composition according to the invention + KCl 0.05% | |
| Composition according to the invention | Composition according to the invention | 10 |
| Composition according to the invention 2Pe 0.1% | Composition according to the invention + KCl 0.05% | |
| Composition according to the invention | Water (untreated control) | 10 |
| Composition according to the invention 2Pe 0.1% | | |
| Composition according to the invention | Water (untreated control) | 10 |
| Composition according to the invention 2PE + $K_2CO_3$ 0.05% | | |
| Composition according to the invention | Water (untreated control) | 10 |
| Composition according to the invention 2PE + KCl 0.05% | | |
| | | Total = 60 |

A total of 60 replicates were performed for this study.

Arena Setup:

2-D termite foraging arenas consisting of two clear acrylic plates (24 cm×24 cm) separated by spacers and were secured together with bolts. Each arena contained moistened sand and filter paper circles. The sand around each paper filter circle was treated with the pre-designated treatment.

To assemble each arena, first the top plate was placed face-down and moistened with distilled water using a spray bottle. Two pieces of filter paper (55 mm diameter) were placed directly onto the top plate. These two pieces of filter paper were placed in such a way as to be equidistant from the release chamber and from the sides. Filter papers were approximately 10 cm from the release chamber and approximately 5 mm from the arena sides. Sand was scattered over this plate, and excess sand was leveled off using a straight edge. The sand surface was misted again with distilled water using a spray bottle to the point of being damp without any runoff. A treated trail of pre-designated product was then pipetted on the sand around the circumference of the filter paper circles at a rate of approximately 0.18 ml/cm. For each replicate, the location of Treatment A and Treatment B alternated. The bottom plate was then secured to the top of the arena and flipped over.

Filter Paper:

Filter paper used in this study was approximately 55 mm in diameter. It was oven dried at approximately 120° C. for approximately 2 hours and weighed prior to placing them in each arena. It was dried, cleaned, and weighed again at the conclusion of this study, after being exposed to termites for 4 days.

Bioassay:

500 Formosan subterranean termites consisting of a 10% soldier ratio (450 workers:50 soldiers) were placed into the release chamber of each of the 60 replicates and the lid placed on the release chamber. Arenas were maintained in an environmental chamber at 28° C. and 80% RH for 4 days. At that time, arenas were disassembled, and filter paper collected, cleaned of sand residue, dried, and weighed.

Figure 3:
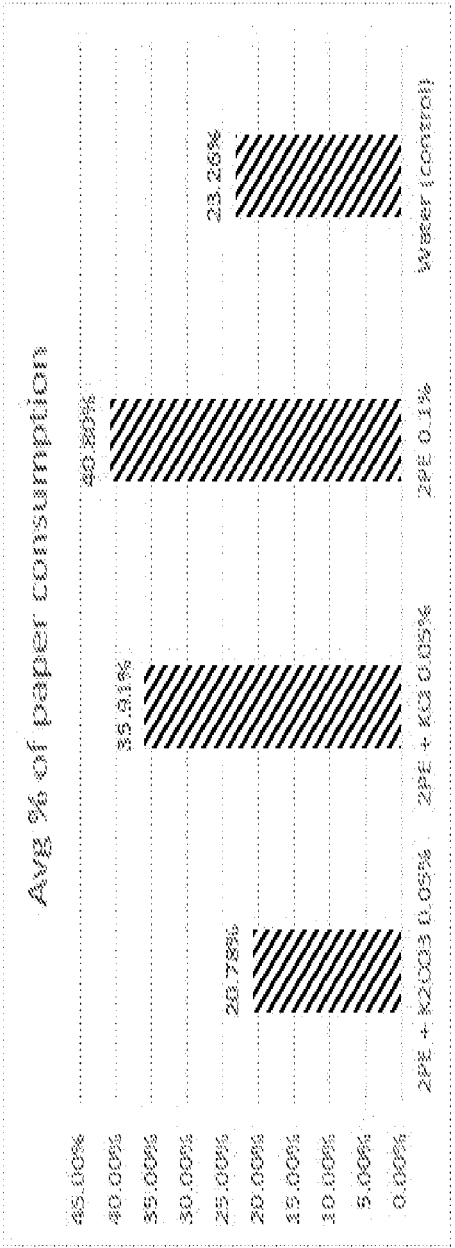
FIG. 3 is a graph showing the average percent of paper consumed by termites with the novel 2-phenoxyethanol and/or potassium chloride composition and soil treatment that elevated soil water concentrations and resulted in recruited of termites to the paper water concentrations compared to untreated control repetitions.

Data Collection:

The following data points were collected for each replicate:
1. Treatment A filter paper dry weight before termite exposure
2. Treatment A filter paper dry weight after termite exposure
3. Weight of filter paper consumed (Treatment A)
4. Percent consumption for Treatment A filter paper
5. Treatment B filter paper dry weight before termite exposure
6. Treatment B filter paper dry weight after termite exposure
7. Weight of filter paper consumed (Treatment B)
8. Percent consumption for Treatment B filter paper FIG. 3 is a graph showing the average percent of paper consumption from termites with the novel trailing and recruitment compositions in the invention. The results teach us that 2-PE and 2-PE+KCl increased termite activity and the percentage of paper consumption significantly when soil around the termite food source was treated.

Figure 4:
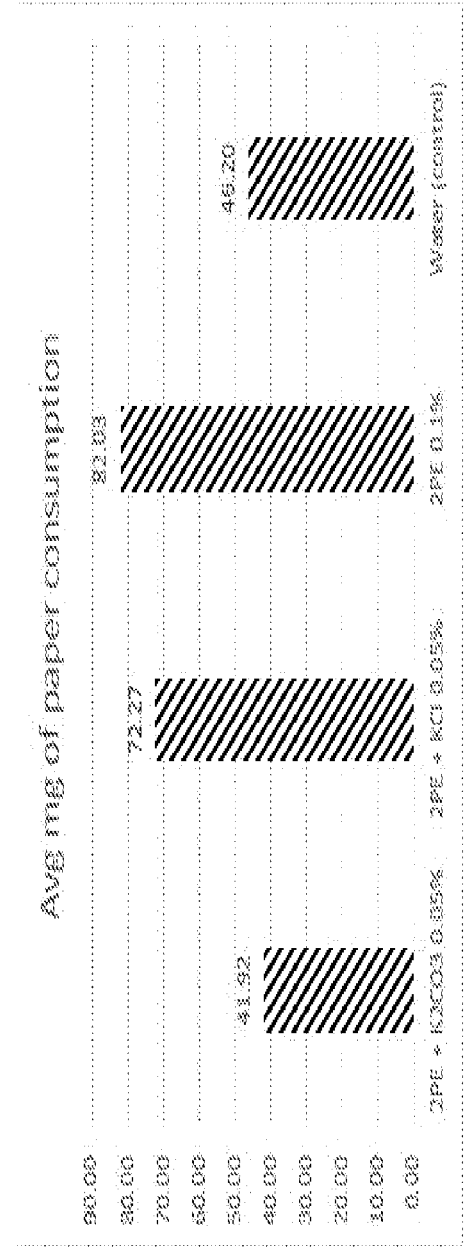
FIG. 4 is a graph showing the average mg of paper consumed by termites with the novel 2-phenoxyethanol and/or potassium chloride composition and soil treatment that elevated soil water concentrations and resulted in recruited of termites to the paper water concentrations compared to untreated control repetitions.

FIG. 4 is a graph showing the average mg of paper consumption with the novel trailing and recruitment compositions in the invention. The results teach us that 2-PE and 2-PE+KCl increased termite activity and the mg of paper consumption significantly when soil around the termite food source was treated.

Results:

Completed data sheets of each arena were compiled after 4 days of termite activity.

Analysis of variance (ANOVA) followed by post-hoc Tukey test using SigmaPlot (Systat Software, Inc.) yielded a significant difference in weight of filter paper consumed across all treatments (H=16.751, df=3, P<0.001). TABLE B below shows differences between treatments:

TABLE B

| Treatment | Mean Weight Consumed (g) + SD. Different letters indicate significant differences according to Tukey's post hoc differentiation after ANOVA |
|---|---|
| Composition according to the invention: 2PE + 2Pe 0.1% | 0.0820 + 0.0473 A |
| Composition according to the invention: 2PE + $K_2CO_3$ 0.05% | 0.0419 + 0.0266 C |
| Composition according to the invention: 2PE + KCl 0.05% | 0.0723 + 0.0424 AB |
| Water | 0.0462 + 0.0361 BC |

From this data analysis, it can be determined that termites fed more on filter paper surrounded by the Composition according to the invention 2Pe 0.1% and Composition according to the invention 2Pe+KCl 0.05% than any other treatment, and there was not a significant difference in feeding between these two aforementioned treatments. Termites even preferred Composition according to the invention 2Pe 0.1% to water as well, though there was no such preference Composition according to the invention 2Pe+KCl 0.05% over water. Termites did not feed significantly more on filter paper surrounded by Composition according to the invention 2Pe+$K_2CO_3$ 0.05% when compared to any other treatment.

The trials prove that termites consume more treated filter paper media when 2Pe and 2Pe+KCl are present around the paper. The amount consumed is almost twice as much as untreated controls ($H_2O$).

FIG. 5 is a diagram layout view of a house structure with termite monitoring or bait stations arranged about the perimeter, A along with a surface applied continuous Phenoxyethanol trail C connecting between each of the termite monitoring or bait stations. B. FIG. 5 is a diagram of connecting monitoring or bait stations B around a house perimeter A with a continuous connecting trail C to prevent termites from tunneling between stations B.

Referring to FIG. 5, the house structure A, can include a wood frame and/or siding (wood-containing structure), and can have a footprint of approximately 30 feet wide by approximately 50 feet long. Each of the termite monitoring or bait stations B can be spaced approximately 20 feet apart from one another spaced outside the footprint A of the wood containing structure. The surface applied continuous connecting trail C between termite monitoring or bait stations B, together form a closed loop perimeter spaced outside footprint A of the wood containing structure. Each continuous connecting trail directs termites away from the wood-containing structure and directly to an adjacent one of the individual termite monitoring or bait stations.

The preferred spacing between monitoring or bait stations is approximately 10-20 ft.

Between each of the termite monitoring or bait stations B, can be a trail of Phenoxyethanol or 2PE+KCl for connecting the stations to one another. The trail C can lead termites to the termite monitoring or bait stations B, and away from the structure A.

TABLE C is a table of the Variable application rates of 2 phenoxyethanol (2-PE) based on soil type. Concentration of dilution applied varies from approximately 0.1% to approximately 2.0% depending on soil conditions. Total water to move 2-PE into the ground remains constant.

TABLE C

| Soil type | Infiltration rate (Hillel 1982) | Gallons of dilution/10 ft | ml of 2-PE in dilution | % 2PE | Water (gal/10 ft) to apply after treatment | Total dilution + water |
|---|---|---|---|---|---|---|
| Sand | Approx. 0.8 | Approx. 4 | Approx. 15.14 | 0.1 | 0 | Approx. 4 |
| Sandy & silty soil | Approx. 0.4 | Approx. 2 | Approx. 15.14 | 0.2 | Approx. 2 | Approx. 4 |
| Loam | Approx. 0.2 | Approx. 1 | Approx. 15.14 | 0.4 | Approx. 3 | Approx. 4 |
| Clay soil | Approx. 0.04 | Approx. 0.2 | Approx. 15.14 | 2 | Approx. 3.8 | Approx. 4 |

Table C shows the variable application rates for 4 soil types, which includes Sand, Sandy & silty soil, Loam, and Clay soil.

The infiltration rates for the four (4) soil types in Table C are from the published water infiltration rates which have support from Table 3 of the Soil Infiltration Brochure, Guides for Educators, May 2014 published by the United States Department of Agriculture, National Resources Conservation Service (NRCS) Guides for Educators, May 2014, seven pages. The infiltration rates are from a textbook. It is "Introduction to Soil Physics" by Daniel Hillel, 1982 Academic Press, 392 pages.

The infiltration rates provide a guide to the general permeability of soil types on which to assess the necessary concentration and volume if 2-PE and KCl and/or K2CO3.

In order to have the product not pool on the soil surface and spread out rather than percolate into the soil, we have varied the percentage of 2-PE in the application volume to deliver the same amount of 2 phenoxyethanol per 10 linear feet to the different soil types. To compensate for the lower amounts of water for the soils that have lower water infiltration rates, we have calculated the amount of water that should be used to irrigate the soil and move the treatment down to the position of subterranean termites below the soil surface. The concentrations recommended go from approximately 0.1% to approximately 2%. A concentration of approximately 0.08 to approximately 0.2% could be used.

Various Soil Treatment Methods will now be described.

Sandy Soil Treatment Method. A treatment with the current invention could be applied to sandy soil in the following manner. Monitoring/bait stations would be placed in the sandy soil around a structure and spaced approximately 20 ft apart. In a spray tank, A volume of 15.14 ml of 2Pe would be added for every 10 ft to be treated to connect the stations. The water would be added to the spray tank to achieve 4 gallons of total solution per 10 linear ft or 0.1% solution. The 4 gallons of 0.1% solution would be poured or sprayed onto the soil surface to create an uninterrupted line between the bait/monitoring stations. No additional water would be added to the treatment line The solution would wet the soil to a depth of 2-6 inches where termites actively tunnel. The termites would then follow the treated line to the bait/monitoring stations.

Sandy Silty Soil Treatment Method. A treatment with the current invention could be applied to sandy silty soil in the following manner. Monitoring/bait stations would be placed in the sandy silty soil around a structure and spaced approximately 10-20 ft apart. In a spray tank, A volume of 15.14 ml of 2Pe would be added for every 10 ft to be treated to connect the stations. The water would be added to the spray tank to achieve 2 gallons of total solution per 10 linear ft or 0.2% solution. The 2 gal of 0.2% solution per 10 linear ft would be poured or sprayed onto the soil surface to create an uninterrupted line between the bait/monitoring stations. After applying the 2Pe solution, 2 gal of water per 10 linear ft would be applied to the treated line in order to slowly move the treatment vertically into the soil profile without horizontal runoff. The solution would wet the soil to a depth of 2-6 inches where termites actively tunnel. The termites would then follow the treated line to the bait/monitoring stations.

Loam Soil Treatment Method. A treatment with the current invention could be applied to loam soil in the following manner. Monitoring/bait stations would be placed in the loam soil around a structure and spaced approximately 10-20 ft apart. In a spray tank, A volume of 15.14 ml of 2Pe would be added for every 10 ft to be treated to connect the stations. Water would be added to the spray tank to achieve 1 gallon of solution per 10 linear ft or 0.4% solution The 1 gallon of 0.4% solution would be poured or sprayed onto the soil surface to create an uninterrupted line between the bait/monitoring stations. After applying the 2Pe solution, 3 gal of water would be applied to the treated line in order to slowly move the treatment vertically into the soil profile without horizontal runoff. The solution would wet the soil to a depth of 2-6 inches where termites actively tunnel. The termites would then follow the treated line to the bait/monitoring stations.

Clay Soil Treatment Method. A treatment with the current invention could be applied to clay soil in the following manner. Monitoring/bait stations would be placed in the clay soil around a structure and spaced approximately 10-20 ft apart. In a spray tank. A volume of 15.14 ml of 2Pe would be added for every 10 ft to be treated to connect the stations. The water would be added to the spray tank to achieve 0.2 gallon of total solution per 10 linear ft or 2% solution. The 2% solution would be poured or sprayed onto the soil surface to create an uninterrupted line between the bait/monitoring stations. After applying the 2PE solution, a volume of 3.8 gal of water would be applied to the treated line in order to slowly move the treatment vertically into the soil profile without horizontal runoff. The solution would wet the soil to a depth of 2-6 inches where termites actively tunnel. The termites would then follow the treated line to the bait/monitoring stations.

The Benefits for the use of 2-PE and KCl and/or K2CO3 in soil include:

1. Enhanced termite detection capability with the use of monitoring devices with a reduction in time to detection due to directed termite training behavior.
2. Reduction of pesticide use when used in conjunction with termite bait systems that contain toxicants within matrixes and tamper-resistant stations.
3. Reduction of risk for termite damage to wood-containing structures by directing termites away from structures and into termite bait and/or monitoring stations.

The slash symbol "/" used in the description can be interpreted to mean "and", or "or" between each of the terms before and after the slash symbol.

The terms "approximately" or "approximate or approx." can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A termite trailing and recruitment system, comprising:
a plurality of individual termite bait stations, the individual termite bait stations spaced approximately 10 to approximately 20 feet apart from each other, and surrounding a wood-containing structure, each of the individual termite bait stations contain termite toxicants; and
a solution consisting of approximately 0.1% to approximately 2% of 2 phenoxyethanol (2-PE), dissolved in water, applied to a soil surface to form a continuous trail connecting each of the individual termite bait stations to adjacent bait stations, forming a closed loop perimeter around the wood-containing structure, wherein each trail prevents termites from tunneling between the stations, and directs the termites away from the wood-containing structure and into one of the individual termite bait stations containing the termite toxicants.

2. The termite trailing and recruitment system of claim 1, wherein the solution of 2 phenoxyethanol (2-PE) is approximately 0.1% dissolved in water as the trail for sand soil.

3. The termite trailing and recruitment system of claim 1, wherein the solution of 2 phenoxyethanol (2-PE) is approximately 0.2% dissolved in water as the trail for sandy and silty soil.

4. The termite trailing and recruitment system of claim 1, wherein the solution of 2 phenoxyethanol (2-PE) is approximately 0.4% dissolved in water as the trail for loam soil.

5. The termite trailing and recruitment system of claim 1, wherein the solution of 2 phenoxyethanol (2-PE) is approximately 2% dissolved in water as the trail for clay soil.

6. A method for trailing and recruiting termites to termite bait stations containing termite toxicants, comprising the steps of
providing a plurality of individual termite bait stations, each of the termite bait stations containing termite toxicants;
positioning the termite bait stations approximately 10 to approximately 20 feet apart from each other, and surrounding a wood-containing structure;
providing a solution consisting of approximately 0.1% to approximately 2% of 2 phenoxyethanol (2-PE) dissolved in water;
applying a continuous trail of the solution to a soil surface and connecting each termite bait station to adjacent bait stations, forming a closed loop perimeter spaced outside around the wood-containing structure, wherein each trail prevents termites from tunneling between the stations, and directs the termites away from the wood-containing structure into one of the individual bait stations containing the termite toxicants.

7. The method of claim 6, wherein the solution of 2 phenoxyethanol (2-PE) is approximately 0.1% dissolved in water as the trail for sand soil.

8. The method of claim 6, wherein the solution of 2 phenoxyethanol (2-PE) is approximately 0.2% dissolved in water as the trail for sandy and silty soil.

9. The method of claim 6, wherein the solution of 2 phenoxyethanol (2-PE) is approximately 0.4% dissolved in water as the trail for loam soil.

10. The method of claim 6, wherein the solution of 2 phenoxyethanol (2-PE) is approximately 2% dissolved in water as the trail for clay soil.

11. A termite trailing and recruitment system, comprising:
a plurality of individual termite monitoring stations, the individual termite monitoring stations spaced approximately 10 to approximately 20 feet apart from each other, and surrounding a wood-containing structure;
a solution consisting of approximately 0.1% to approximately 2% of 2 phenoxyethanol (2-PE) dissolved in water, applied to a soil surface to form a continuous trail connecting each of the individual termite monitoring stations to adjacent termite monitoring stations, forming a closed loop perimeter around the wood-containing structure, wherein each trail prevents termites from tunneling between the stations, and directs the termites away from the wood-containing structure and into one of the individual termite monitoring stations, the individual termite monitoring stations containing termite toxicants.

12. The termite trailing and recruitment system of claim 11, wherein the solution of 2 phenoxyethanol (2-PE) is approximately 0.1% dissolved in water as the trail for sand soil.

13. The termite trailing and recruitment system of claim 11, wherein the solution of 2 phenoxyethanol (2-PE) is approximately 0.2% dissolved in water as the trail for sandy and silty soil.

14. The termite trailing and recruitment system of claim 11, wherein the solution of 2 phenoxyethanol (2-PE) is approximately 0.4% dissolved in water as the trail for loam soil.

15. The termite trailing and recruitment system of claim 11, wherein the solution of 2 phenoxyethanol (2-PE) is approximately 2% dissolved in water as the trail for clay soil.

16. A method for trailing and recruiting termites to termite monitoring stations, comprising the steps of
providing a plurality of individual termite monitoring stations;
positioning the termite monitoring stations approximately 10 to approximately 20 feet apart from each other, and surrounding "after the word" stations surrounding a wood-containing structure;
providing a solution consisting of 0.1% to approximately 2% of 2 phenoxyethanol (2-PE) dissolved in water;
applying a continuous trail of the solution to a soil surface and connecting each of the termite monitoring stations to adjacent termite monitoring stations;
forming a closed loop perimeter spaced outside around the wood-containing structure with the spaced apart termite monitoring stations, wherein each trail prevents termites from tunneling between the stations, and directs the termites away from the wood-containing structure and into one of the individual termite monitoring stations, the individual termite monitoring stations containing termite toxicants.

17. The method of claim 16, wherein the solution of 2 phenoxyethanol (2-PE) is approximately 0.1% dissolved in water as the trail for sand soil.

18. The method of claim 16, wherein the solution of 2 phenoxyethanol (2-PE) is approximately 0.2% dissolved in water as the trail for sandy and silty soil.

19. The method of claim 16, wherein the solution of 2 phenoxyethanol (2-PE) is approximately 0.4% dissolved in water as the trail for loam soil.

20. The method of claim 16, wherein the solution of 2 phenoxyethanol (2-PE) is approximately 2% dissolved in water as the trail for clay soil.

21. A method for trailing and recruiting termites, consisting of the steps of:
providing a plurality of individual stations selected from the group consisting of individual termite bait stations and individual termite monitoring stations, the individual termite bait stations and the individual termite monitoring stations contain termite toxicants;
positioning the individual stations approximately 10 to approximately 20 feet apart from each other surrounding a wood-containing structure;
providing a solution consisting between approximately 0.1% and approximately 2% of 2 phenoxyethanol (2-PE) dissolved in water;
applying a continuous trail of the solution to a soil surface and connecting each of the individual stations to adjacent stations;
forming a closed loop perimeter spaced outside around the wood-containing structure, wherein each trail prevents termites from tunneling between the stations, and directs the termites away from the wood-containing structure into one of the individual stations containing the termite toxicants.

22. The method of claim 21, wherein the solution of 2 phenoxyethanol (2-PE) is approximately 0.1% dissolved in water as the trail for sand soil.

23. The method of claim 21, wherein the solution of 2 phenoxyethanol (2-PE) is approximately 0.2% dissolved in water as the trail for sandy and silty soil.

24. The method of claim 21, wherein the solution of 2 phenoxyethanol (2-PE) is approximately 0.4% dissolved in water as the trail for loam soil.

25. The method of claim 21, wherein the solution of 2 phenoxyethanol (2-PE) is approximately 2% dissolved in water as the trail for clay soil.

* * * * *